US007866693B2

United States Patent
Onohara et al.

(10) Patent No.: US 7,866,693 B2
(45) Date of Patent: Jan. 11, 2011

(54) AIRBAG AND AIRBAG SYSTEM

(75) Inventors: Keisuke Onohara, Tokyo (JP); Motokazu Nakagawa, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 12/457,225

(22) Filed: Jun. 4, 2009

(65) Prior Publication Data

US 2009/0250913 A1    Oct. 8, 2009

Related U.S. Application Data

(63) Continuation-in-part of application No. 11/493,809, filed on Jul. 27, 2006, now abandoned.

(30) Foreign Application Priority Data

Jul. 29, 2005  (JP) ............................. 2005-221247

(51) Int. Cl.
*B60R 21/231* (2006.01)
(52) U.S. Cl. ................................. 280/743.1
(58) Field of Classification Search ............. 280/743.1
See application file for complete search history.

(56) References Cited

U.S. PATENT DOCUMENTS

| | | | | |
|---|---|---|---|---|
| 5,316,337 A | * | 5/1994 | Yamaji et al. ............ | 280/743.1 |
| 5,423,273 A | * | 6/1995 | Hawthorn et al. ......... | 112/441 |
| 5,520,414 A | * | 5/1996 | Bishop .................... | 280/743.1 |
| 6,129,382 A | * | 10/2000 | Tonooka ................. | 280/743.1 |
| 6,572,144 B2 | * | 6/2003 | Igawa .................... | 280/743.1 |
| 6,679,522 B2 | * | 1/2004 | Igawa .................... | 280/743.1 |
| 7,000,947 B2 | * | 2/2006 | Kumagai et al. ......... | 280/743.1 |
| 7,318,604 B2 | * | 1/2008 | Miller .................... | 280/743.1 |
| 7,407,186 B2 | * | 8/2008 | Rose et al. .............. | 280/743.1 |
| 7,461,861 B2 | * | 12/2008 | Keshavaraj ............. | 280/743.1 |

* cited by examiner

*Primary Examiner*—Paul N Dickson
*Assistant Examiner*—Nicole Verley
(74) *Attorney, Agent, or Firm*—Manabu Kanesaka

(57) ABSTRACT

An airbag includes a front portion having an upper part for receiving a head of the occupant, a middle part and a lower part. The upper part has an upwardly protruding curved edge without a linear portion, and two laterally protruding upper curved edges. The middle part has two laterally inwardly curved middle side edges extending smoothly from the laterally protruding upper curved edges. The lower part haw two laterally inwardly and downwardly curved lower side edges, and a downwardly protruding curved edge without a linear portion. The lower part has a lateral width greater than that of the upper and middle parts to thereby form laterally projecting portions for receiving occupant's arms. The downwardly extending curved edge at the lower part has a curvature greater than that of the upwardly extending curved edge at the upper part.

6 Claims, 10 Drawing Sheets

FIG. 4 (a)  Prior Art
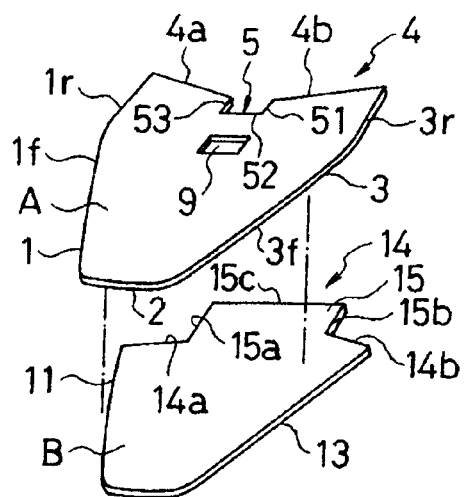
FIG. 4 (b)  Prior Art
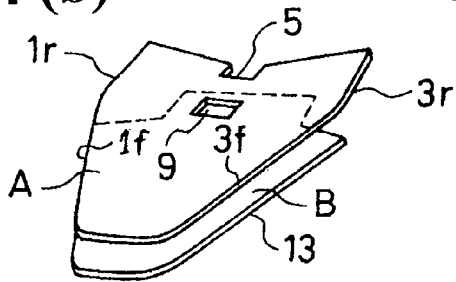
FIG. 4 (c)  Prior Art
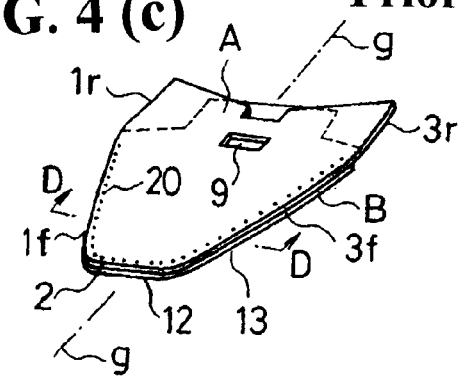
FIG. 4 (d)  Prior Art
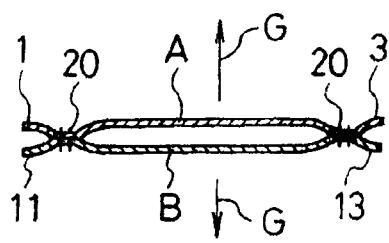

FIG. 5 (a) Prior Art
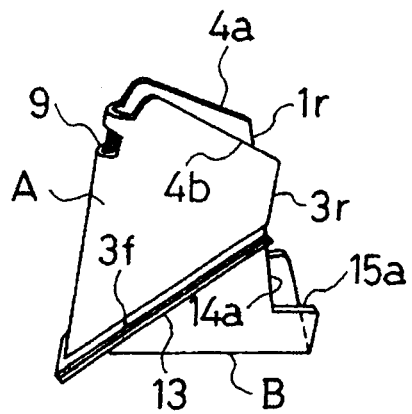
FIG. 5 (b) Prior Art
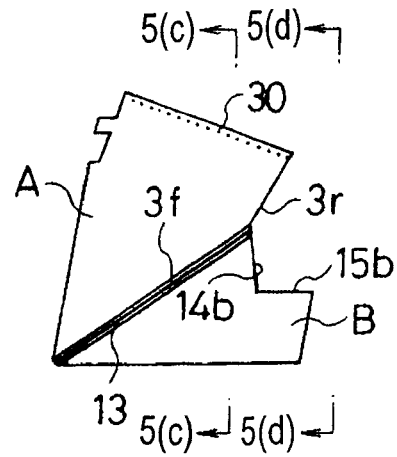
FIG. 5 (c) Prior Art
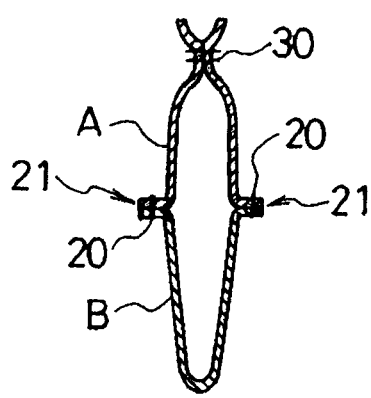
FIG. 5 (d) Prior Art
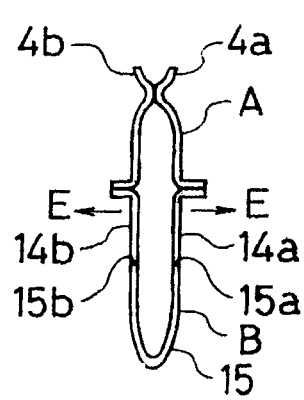
FIG. 5 (e) Prior Art
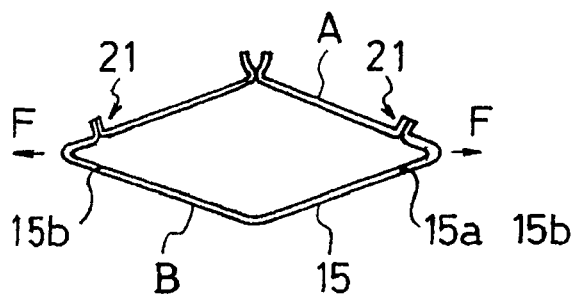
FIG. 5 (f) Prior Art
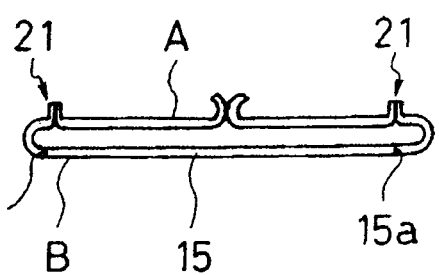

AIRBAG AND AIRBAG SYSTEM

CROSS-REFERENCE TO RELATED APPLICATION

This is a continuation in part application of Ser. No. 11/493,809 filed on Jul. 27, 2006 now abandoned.

BACKGROUND OF THE INVENTION AND RELATED ART STATEMENT

The present invention relates to an airbag and an airbag system for use in automobiles and so forth.

It is known to provide a driver-seat airbag system to a steering wheel and a passenger airbag system to an instrument panel in front of a passenger seat to restrain the occupants of an automobile in a collision.

As an airbag system that receives the arms of an occupant with an airbag to restrain the occupant in a collision, an airbag system having a driver-seat airbag and arm bags disposed on the right and left of the lower part of the driver-seat airbag is disclosed in Japanese Unexamined Patent Application Publication No. 2003-182500. However, the airbag system uses three airbags in total, so that it may increase in cost.

One example is an airbag formed of two front and rear panels. FIGS. 11 to 18 of Japanese Unexamined Patent Application Publication No. 2000-25544 describe an airbag having a large thickness in an inflated state and a procedure for sewing it. The airbag and its sewing procedure will now be described with reference to FIGS. 4 to 11 disclosed in the attached drawings of the specification.

According to claim 2 of the reference,

"An airbag comprising two substantially trapezoidal panels A and B sewn together, wherein the panel A has a side 2 corresponding to the upper side of the trapezoid, a side 4 corresponding to the bottom of the trapezoid, and sides 1 and 3, corresponding to the hypotenuses of the trapezoid, the side 4 having a rectangular cut 5 in the center;

the panel B has a side 12 corresponding to the upper side of the trapezoid, a side 14 corresponding to the bottom of the trapezoid, and sides 11 and 13 corresponding to the two hypotenuses of the trapezoid, the side 14 having a rectangular projection 15 in the center;

the projection 15 having sides 15a and 15b continuing to the side 14, and a side 15c connecting the sides 15a and 15b, the side 1 of the panel A having a side 1f overlapping the side 11 of the panel B and a side 1r extending therefrom;

the side 3 of the panel A having a side 3f overlapping the side 13 of the panel B and a side 3r extending therefrom;

the side 4 of the panel A having sides 4a and 4b on both sides of the rectangular cut 5;

the rectangular cut 5 having sides 51 and 53 continuing to the sides 4a and 4b and a side 52 connecting the sides 51 and 53;

the side 14 of the panel B having sides 14a and 14b between the both sides 15a and 15b of the projection 15 and the sides 11 and 13;

the panels A and B being sewn with a seam 20 along the sides 1f and 11, the sides 2 and 12, and the sides 3f and 13;

the part along the side 4a and the part along the side 4b of the panel A being sewn up with a seam 30;

the part along the side 15a and the part along the side 14a of the panel B being sewn with a seam 58;

the part along the side 15b of the panel A and the part along the side 14b of the panel B being sewn with the seam 58;

the part along the sides 1r and 3r of the panel A and the part along the side 15c of the panel B being sewn up with a seam 48;

the part along the sides 51 and 53 of the rectangular cut 5 and the part along the side 52 of the panel A being sewn with a seam 60."

To manufacture the airbag, as shown in FIGS. 4(a) and 4(b), the two panels A and B are cut from a base fabric and placed one on another. The panel A has the shape of an approximate trapezoid having four sides 1, 2, 3, and 4. The side 4 corresponding to the bottom of the trapezoid is curved in substantially elbow shape, in the center of which the rectangular cut '5 is provided. The side 4 of the panel A has sides 4a and 4b on both sides of the rectangular cut 5. The rectangular cut 5 has sides 51 and 53 that continue to the sides 4b and 4a, respectively, and a side 52 that connects the sides 51 and 53.

The sides 1 and 3 corresponding to the hypotenuses of the trapezoid have front sides 1f and 3f and rear sides 1r and 3r, respectively. The sides 1f and 3f are substantially equal in length to the sides 11 and 13.

The panel A has a gas port 9.

The panel B has the shape of an approximate trapezoid having four sides 11, 12, 13, and 14. The side 14 corresponding to the bottom of the trapezoid has a projection 15. Reference numerals 15a and 15b indicate sides continuing to the side 14 of the projection 15. Numeral 15 denotes a side connecting the sides 15a and 15b. Numerals 14a and 14b indicate parts of the side 14 extending to both sides of the projection 15.

The panels A and B have been put one on the other such that the sides 1f and 11, the sides 2f and 12, and the sides 3f and 13 correspond to each other, and are sewn along the sides 1 to 3 and 11 to 13, as shown in FIGS. 4(c) and 4(d). Numeral 20 indicates a seam thereof. The sides 1r and 3r extend over the sides 11 and 13, respectively, so that they are not sewn to the sides 11 and 13. FIG. 4(d) is a cross sectional view taken along line D-D of FIG. 4(c).

The panels A and B of the sewn body are drawn along the arrow G of FIG. 4(d).

Thus, as shown in FIGS. 5(a) and 6, the panel A is folded in two along the center line g in FIG. 4(c), so that the sides 4a and 4b overlap with each other. The panel B is also folded in two along the center line g, and the projection 15 is also folded in two, so that the sides 15a and 15b overlap with each other, and also the sides 14a and 14b overlap with each other. Then, as shown in FIGS. 5(b) and 7, the parts of the panel A along the sides 4a and 4b are sewn up. Numeral 30 indicates a seam along the sides 4a and 4b.

FIG. 5(c) is a cross-sectional view taken along line 5(c)-5(c) of FIG. 5(b); FIG. 5(d) is a cross-sectional view taken along arrow 5(d)-5(d) of FIG. 5(b).

As shown in FIG. 5(c), the sewing portions 21 with the seam 20 are disposed outside the bag.

The panels A and B of the sewn bag are drawn along arrows E in FIG. 5(d) and as such, are brought into the state shown in FIG. 5(e). They are further drawn along arrows F in FIG. 5(e) into the state shown in FIGS. 5(f) and 8, in which the sides 1r and 3r of the panel A are brought into a straight line.

As shown in FIGS. 9 and 11, the side 15c of the projection 15 is sewn on the sides 1r and 3r of the panel A with a seam 48, and the sides 15a and 14a and the sides 15b and 14b are sewn with a seam 58, respectively.

Subsequently, as shown in FIG. 10(a), the left and right corners 5L and 5R of the rectangular cut 5, at which the sides 52 and 51, and the sides 52 and 53 intersect, respectively, are drawn along arrows $X_B$. As shown in FIG. 10(*b*), the panel A is then sewn along the sides 51, 52, and 53. Numeral 60 indicates a seam thereof.

Thus, the airbag shown in FIG. 11 is completed.

Accordingly, it is an object of the present invention to provide an airbag capable of receiving occupant's arms at low cost.

SUMMARY OF THE INVENTION

According to a first aspect of the invention, an airbag inflates vertically in front of an occupant, wherein the lateral width of the lower part upon inflation is larger than that at a part above the lower part.

According to a second aspect, the airbag of the first aspect has an intermediate part and upper and lower parts, wherein the intermediate part has a relatively small lateral width, and the upper and lower parts having a lateral width larger than that of the intermediate part upon inflation. The relationship is expressed as W2<W1<W3, where W1 is the maximum lateral width of the upper part, W2 is the minimum lateral width of the intermediate part, and W3 is the maximum lateral width of the lower part.

According to a third aspect, in the airbag of the second aspect, W1 is larger than W2 by 50 to 100 mm, and W3 is larger than W1 by 100 to 150 mm.

According to a fourth aspect, an airbag system includes an airbag and an inflator for inflating the airbag, wherein the airbag is one of the first to third aspects.

With the airbag and the airbag system according to the invention, the lateral width of the lower part of the airbag is large, with which the arms of an occupant can be received. The airbag and the airbag system according to the invention are not required to have an arm bag, so that they can be manufactured at a low cost. Furthermore, because the upper part and intermediate part of the airbag are smaller in lateral width than the lower part, the volume of the airbag can be smaller than that for the case where the whole airbag has a large lateral width.

According to the second or third aspect, the lateral width of the upper part is larger than that of the intermediate part, so that the performance in restraining the head of an occupant can be improved.

BRIEF DESCRIPTION OF THE DRAWINGS

FIG. 1(*b*) is a perspective view of the passenger airbag.

FIG. 2(*b*) is a front view of a front panel of the airbag.

FIGS. 4(*a*)-4(*d*) are diagrams showing the procedure for sewing an airbag according to Japanese Unexamined Patent Application Publication No. 2000-25544.

FIGS. 5(*a*)-5(*f*) are diagrams showing the procedure for sewing the airbag according to above publication.

DETAILED DESCRIPTION OF PREFERRED EMBODIMENTS

Embodiments of the present invention will be described hereinbelow with reference to the drawings.

Figure 1:
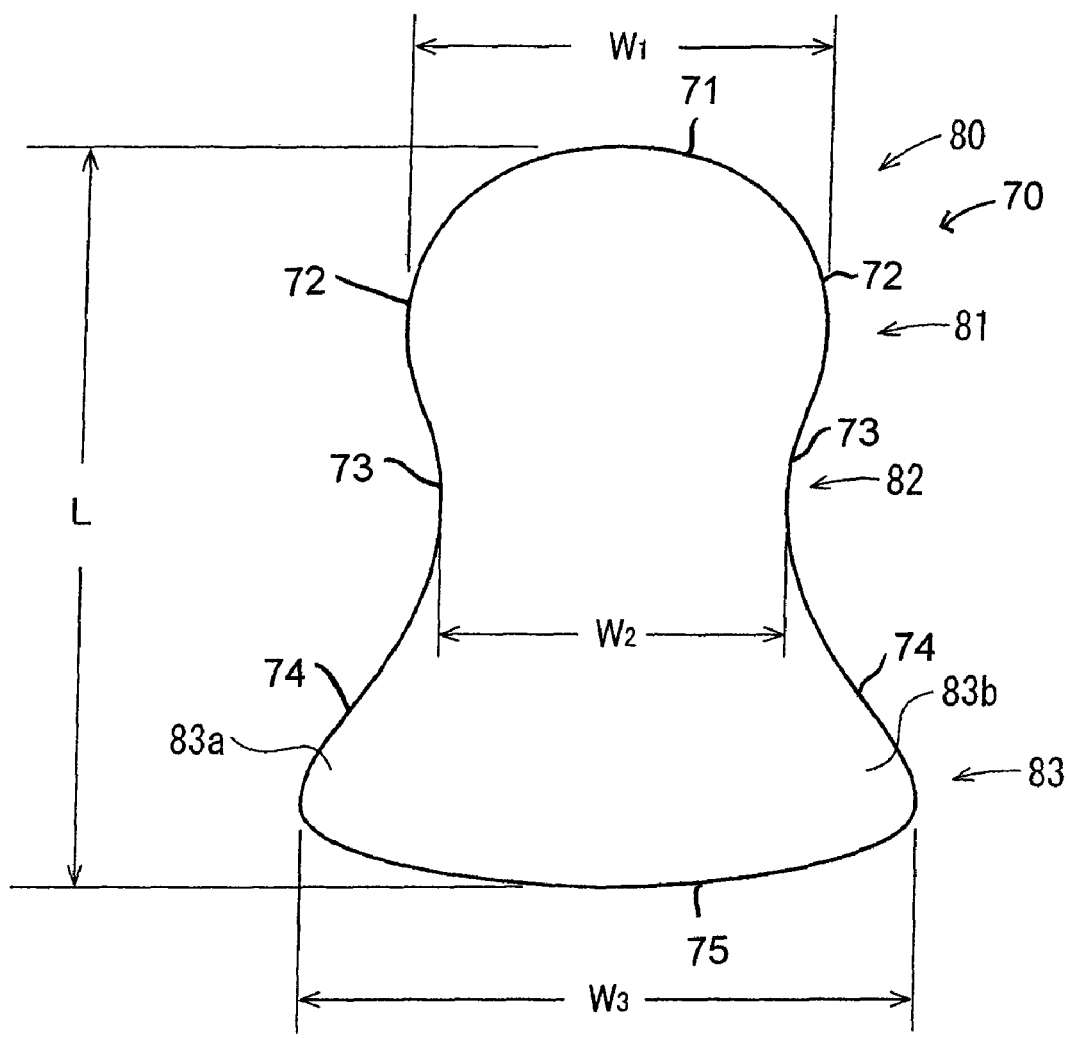
FIG. 1(*a*) is a front view of a passenger airbag according to an embodiment of the present invention.
Figure 1:
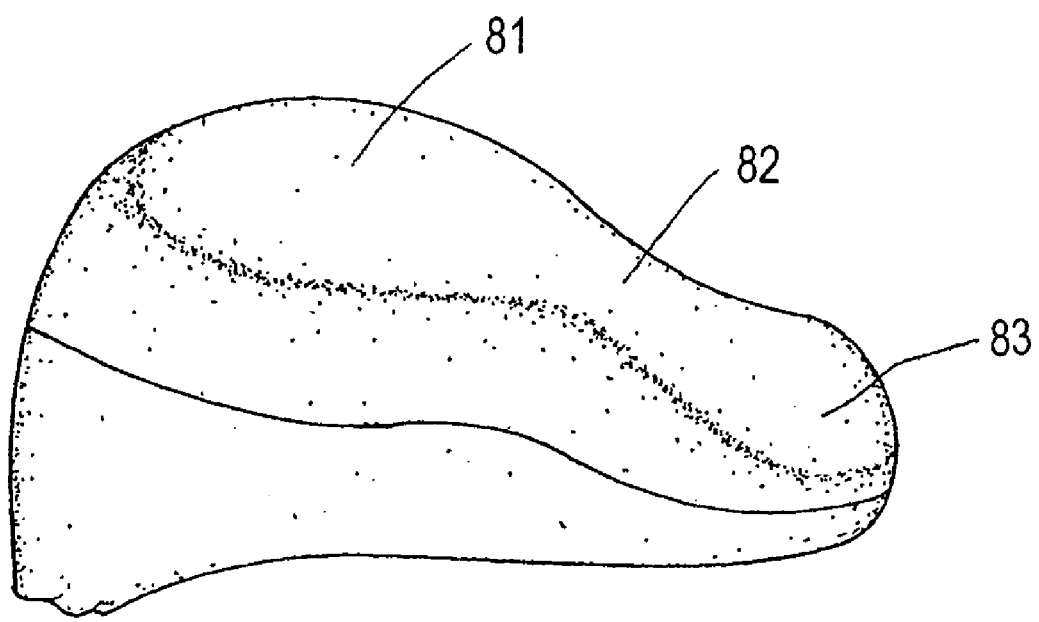
Figure 2:
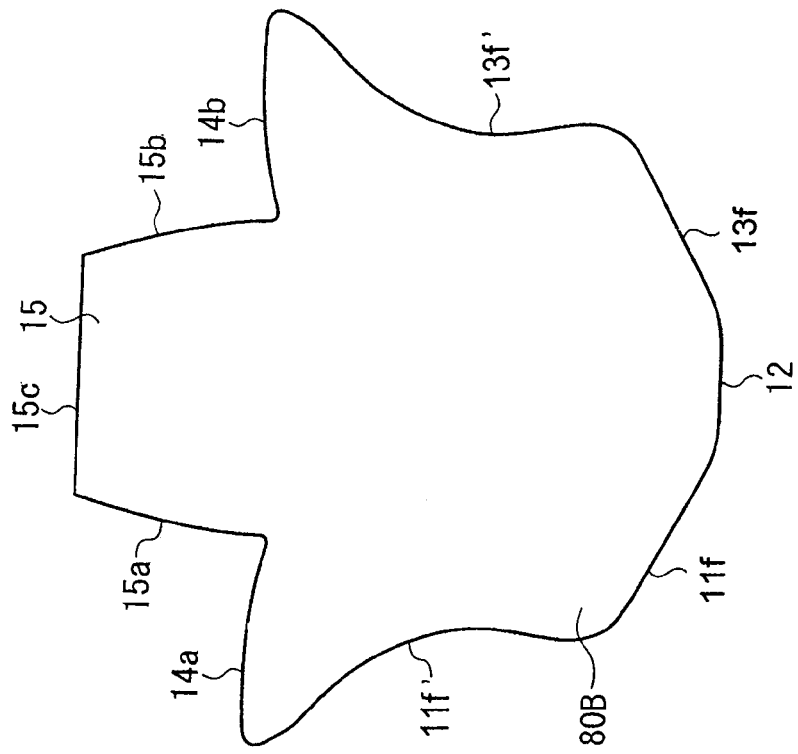
FIG. 2(*a*) is a front view of a rear panel of the airbag.
Figure 2:
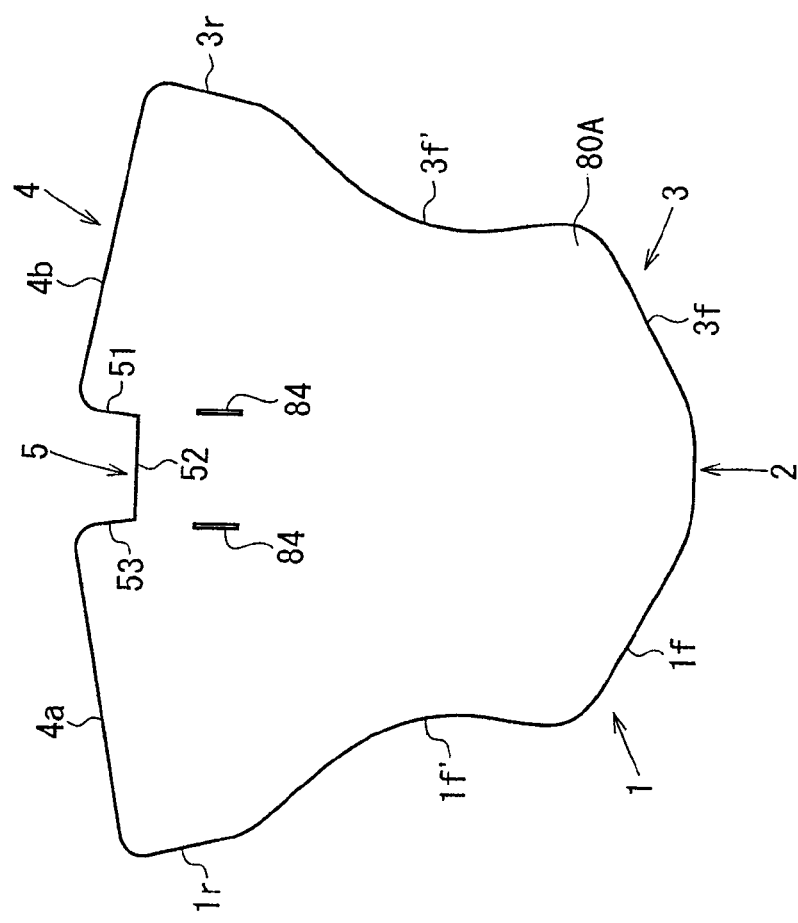
Figure 3:
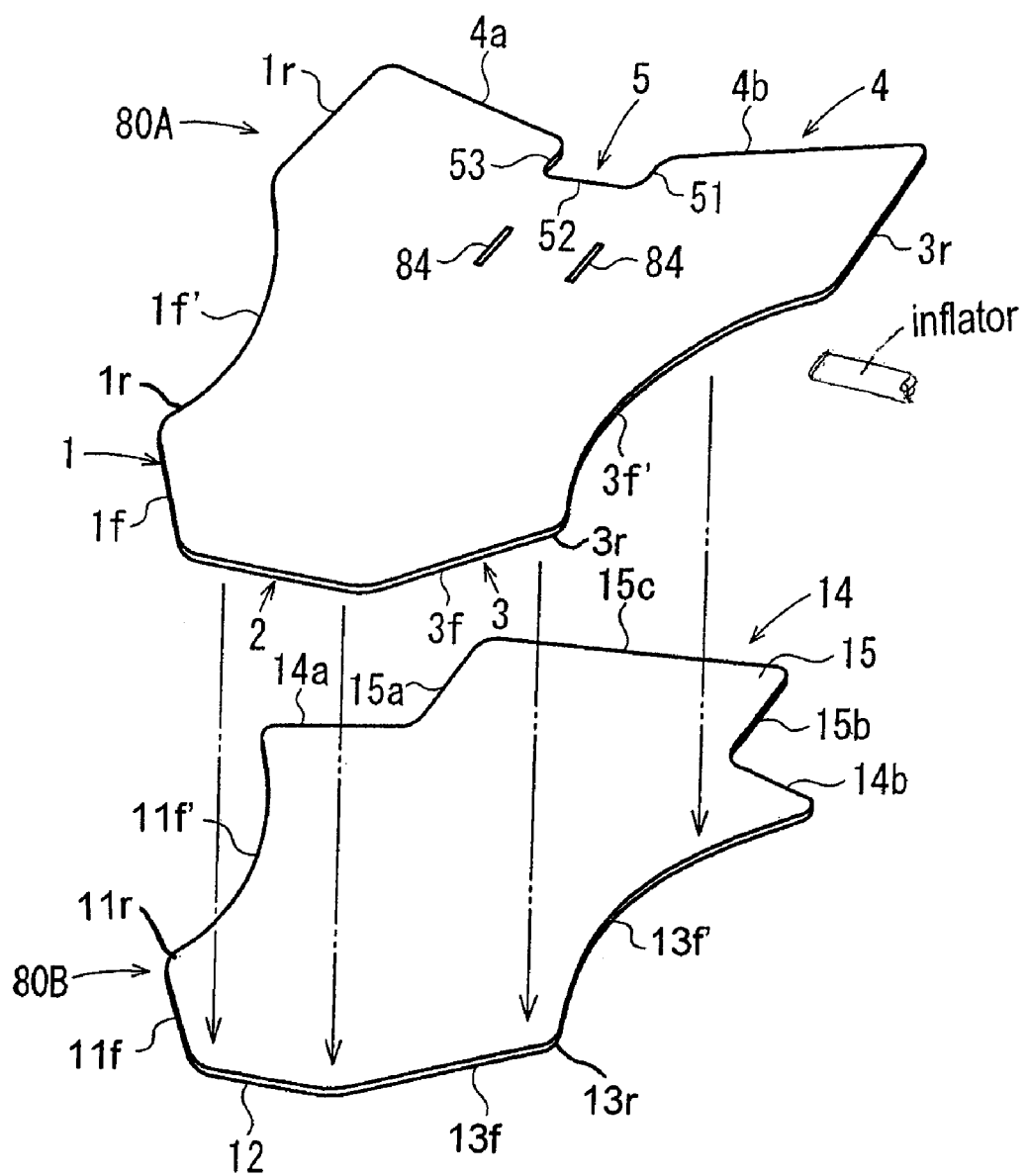
FIG. 3 is a perspective view showing the engaging relationship between the rear panel and the front panel.
Figure 6:
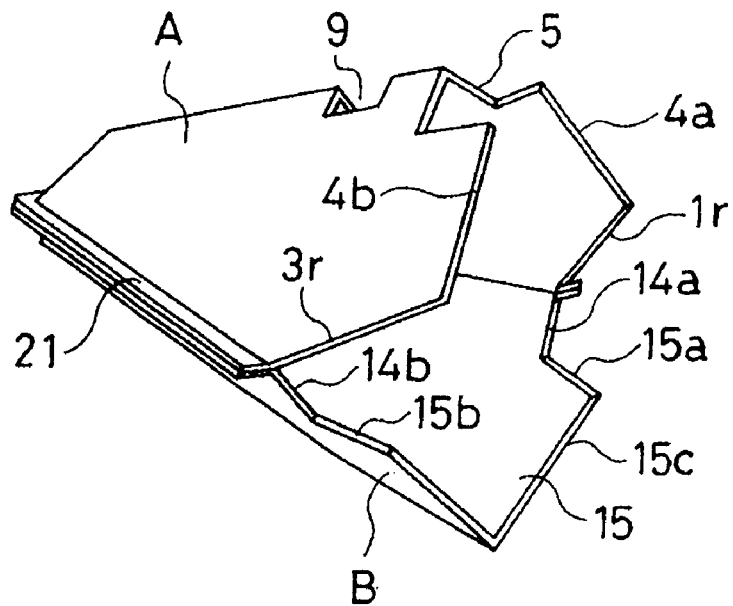
FIG. 6 is a diagram showing the procedure for sewing the airbag according to the above publication
Figure 7:
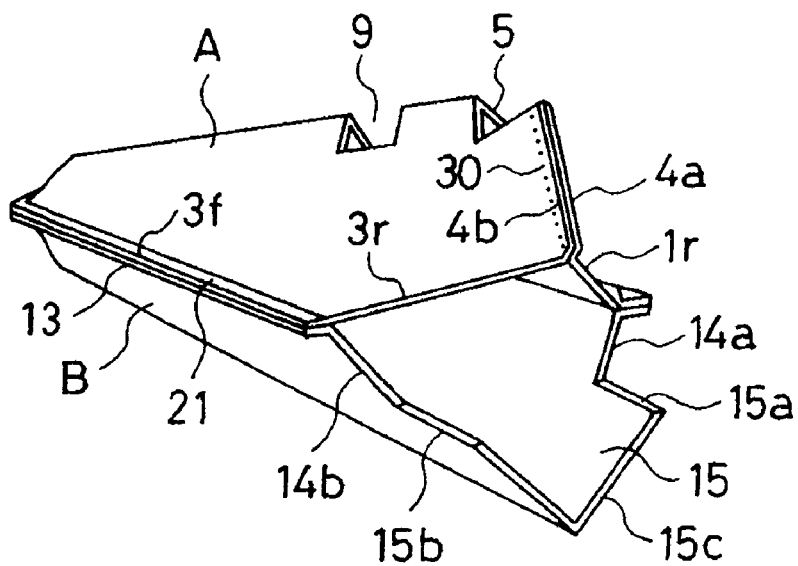
FIG. 7 is a diagram showing the procedure for sewing the airbag according to the above publication.
Figure 8:
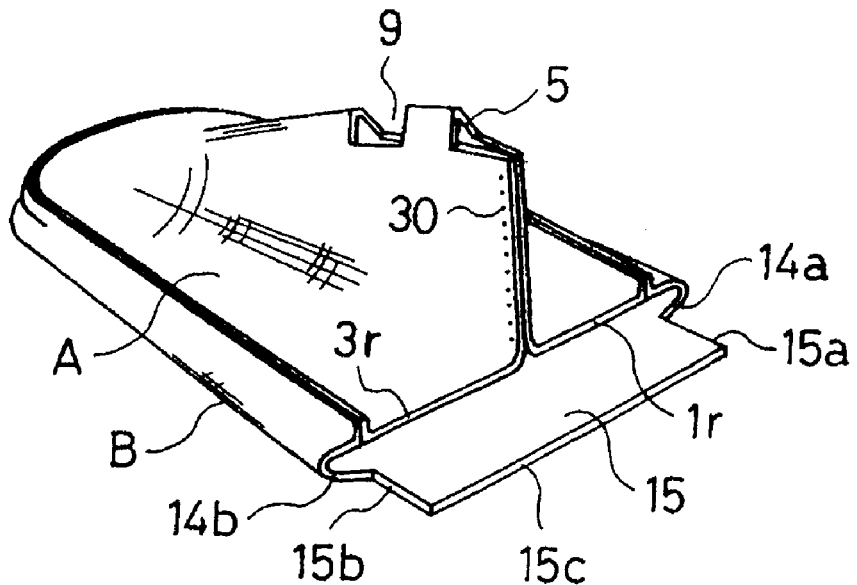
FIG. 8 is a diagram showing the procedure for sewing the airbag according to the above publication.
Figure 9:
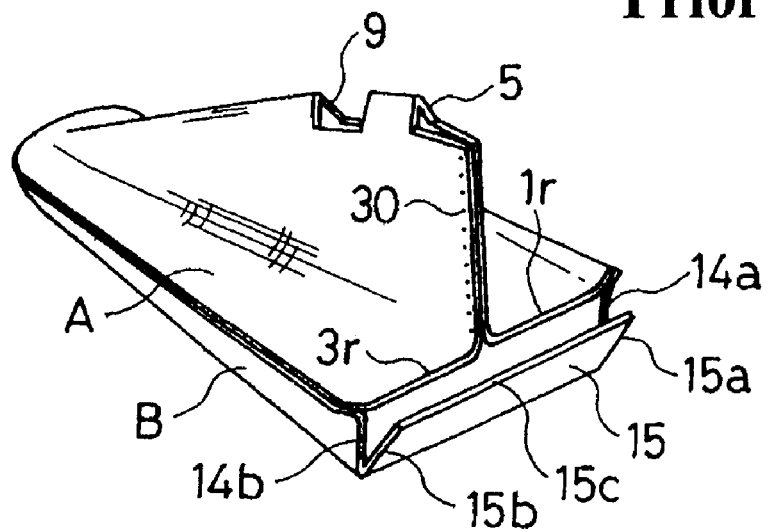
FIG. 9 is a diagram showing the procedure for sewing the airbag according to the above publication.
Figure 10A:
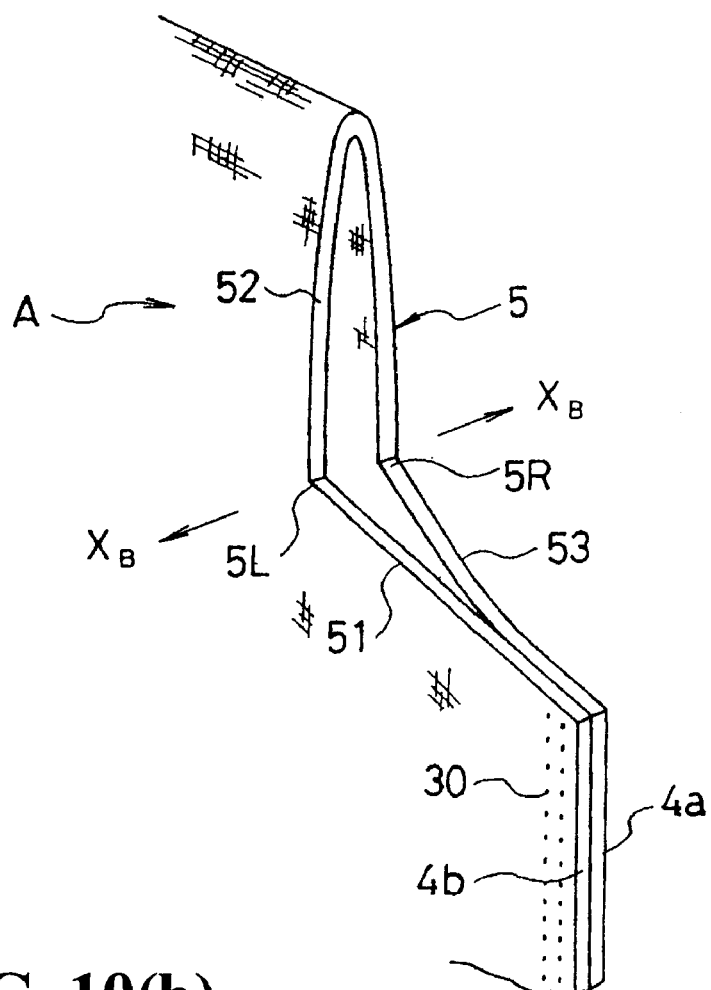
FIG. 10 is a diagram showing the procedure for sewing the airbag according to the above publication
Figure 10B:
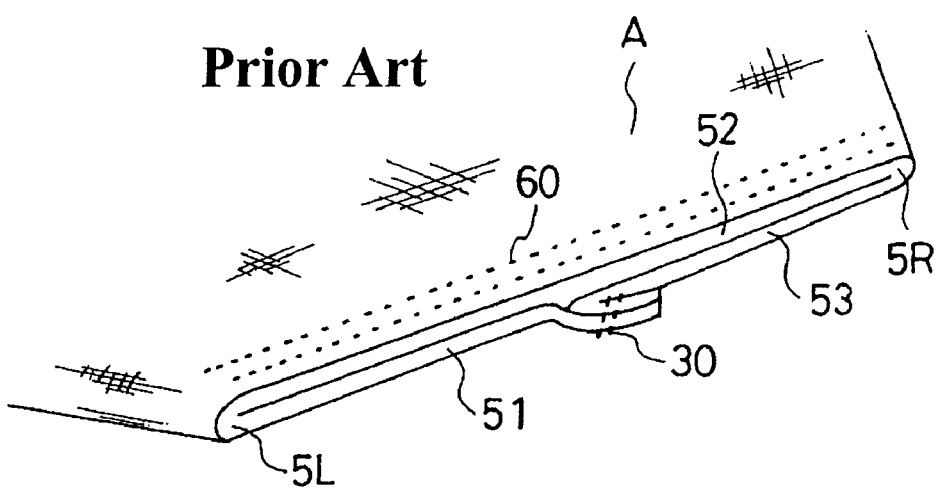
Figure 11:
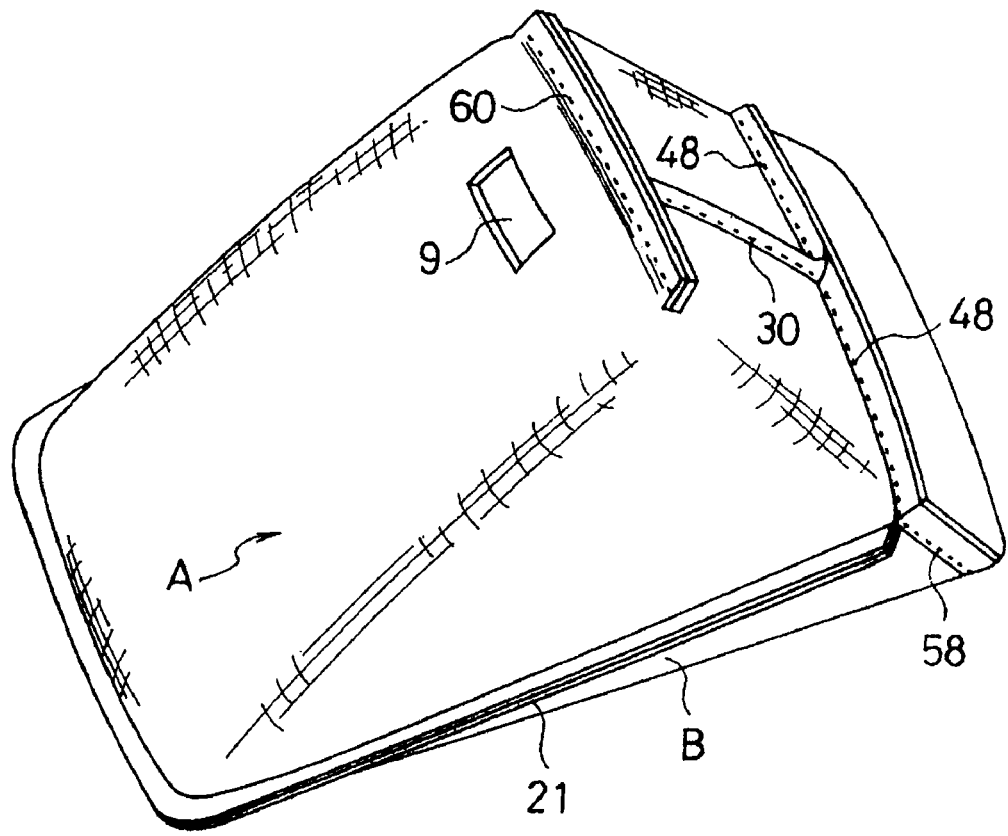
FIG. 11 is a perspective view of the airbag sewn according to the above publication.

FIG. 1(*a*) is a front view of a passenger airbag 80 according to an embodiment; FIG. 1(*b*) is a perspective view of the airbag; FIG. 2(*a*) is a front view of a rear panel of the airbag; FIG. 2(*b*) is a front view of a front panel of the airbag; and FIG. 3 is a perspective view showing the engaging relationship between the rear panel and the front panel.

With the airbag 80 inflated in front of a passenger, the minimum lateral width W2 of an intermediate part 82 is the minimum, the maximum lateral width W1 of an upper part 81 is larger than W2, and the maximum lateral width W3 of a lower part 83 is larger than W1. That is, the lateral width of the airbag 80 has a relationship W2<W1<W3. Preferably, W1 is larger than W2 by 50 to 100 mm, and W3 is larger than W1 by 100 to 150 mm. Preferably, W2 is within the range of 350 to 400 mm, and the vertical length L of the airbag 80 is within the range of 700 to 750 mm. More preferably, W1 is 390 mm, W2 is 410 mm, and W3 is 530 mm.

The airbag 80 can receive occupant's arms with laterally projecting portions 83*a* and 83*b* of the lower part 83. The lateral widths of the intermediate part 82 and the upper part 81 are smaller than that of the lower part 83, and the lateral width of the intermediate part 82 is smaller than that of the upper part 81, so that the airbag 80 is small in volume. Thus, a low-capacity inflator can be used.

In particular, the airbag 80 has a front portion 70 facing the occupant upon inflation. The front portion 70 comprises the upper part 81 for receiving a head of the occupant, the intermediate or middle part 82, and a lower part 83 for receiving a body of the occupant.

The upper part 81 includes an upwardly protruding curved edge 71 without a linear portion, and two laterally protruding upper curved edges 72 extending smoothly from the upwardly protruding curved edge 71. The middle part 82 includes two laterally inwardly curved middle side edges 73 extending smoothly from the laterally protruding upper curved edges 72. The lower part 83 includes two laterally inwardly and downwardly curved lower side edges 74 extending smoothly from the middle side edges 73, and a downwardly protruding curved edge 75 without a linear portion. Since the lower part 83 has a lateral width W3 greater than the widths W1, W2 of the upper and middle parts, laterally projecting portions 83*a*, 83*b* for receiving occupant's arms are formed.

Incidentally, the downwardly extending curved edge 75 at the lower part has a curvature greater than that of the upwardly extending curved edge 71 at the upper part.

Generally, the upper, middle and lower parts 81, 82, 83 are substantially equally divided when viewed in FIG. 1(*a*). The upper part 81 has a generally circular shape in ⅔ thereof though slightly laterally extended.

The airbag 80 according to the embodiment can provide good performance in restraining the head of the occupant, because the lateral width of the upper part 81 is larger than that of the intermediate part 82.

The airbag 80 can be manufactured by sewing the peripheries of a rear panel 80A and a front panel 80B. Since the shapes of the rear panel 80A and the front panel 80B are substantially the same as those of the panels A and B shown in FIGS. 4(a)-4(d), the same components are given the same reference numerals. The difference between the panels 80A and 80B and the panels A and B is that: for the panels A and B, the respective front sides 1f, 3f, 11f, and 13f of the sides 1, 3, 11, and 13 are linear; for the panels 80A and 80B, the front of the sides 1, 3, 11, and 13, contiguous to the forefront linear sides 1f, 3f, 11f, and 13f, form curves 1f', 3f', 11f', and 13f' curved to the center of the panels 80A and 80B.

The front panel 80B comprises a front side 12, two front-lateral sides 11f, 13f disposed to sandwich the front side 12 and inclined rearwardly from the front side 12, two lateral-curved sides 11f', 13f' extending rearwardly from the two front-lateral sides 11f, 13f respectively and curved inwardly with respect to each other, two rear-lateral sides 14a, 14b extending toward each other from the two lateral-curved sides 11f', 13f', and a rectangular projection 15 extending from inside the rear-lateral sides 14a, 14b in a direction opposite to the front side.

The rear panel 80A comprises a front side 2, two front-lateral sides 1f, 3f and two lateral-curved sides 1f', 3f', having shapes similar to those of the front panel 80B, and two rear-lateral sides 4a, 4b extending toward each other from the two lateral-curved sides 1f', 3f' of the rear panel with a rectangular cut 5 therebetween.

The rear panel 80A has a pair of parallel slits 84 in place of the opening 9. An inflator is disposed in the airbag 80 through the slits 84.

The method of sewing the panels 80A and 80B is completely the same as for the panels A and B shown in FIGS. 4 to 11. Since the curves 1f', 3f', 11f', and 13f' are provided, the intermediate part 82 with a small lateral width can be formed. Since the lateral widths of the sides 1f' and 3f' are smaller than those of the sides 1r and 3r, and the lateral widths of the sides 11f' and 13f' are smaller than those of the sides 11r and 13r, the lateral width of the upper part 81 can be made smaller than that of the lower part 83.

In the airbag 80 of the invention, when the airbag is inflated, the front surface facing the occupant and formed by the front panel 80B has the upper part 81, the intermediate part 82 and the lower part 83, as explained above. However, the peripheral portion of the front panel 80B generally extends rearwardly and sewed to the peripheral portion of the rear panel 80A. Thus, at the sewing portion between the rear and front panels 80A, 80B, the lateral sides or width corresponding to the upper part 81 is slightly reduced, and the lateral sides or width corresponding to the intermediate part 82 is slightly enlarged, but the lateral sides of the lower part 83 are generally the same. The sewing portion between the rear and front panels 80A, 80B is the largest in lateral size when the airbag is inflated. The inflated condition of the airbag 80 is shown in FIG. 1(b).

The disclosure of Japanese Patent Application No. 2005-221247 filed on Jul. 29, 2005 is incorporated herein as a reference.

While the invention has been explained with reference to the specific embodiment of the invention, the explanation is illustrative and the invention is limited only by the appended claims.

What is claimed is:

1. An airbag inflating vertically in front of an occupant, comprising:
    a front panel for forming a front portion facing the occupant upon inflation, and
    a rear panel for forming a rear portion, disposed at a side opposite to the front panel and sewed thereto at peripheral portions,
    wherein said front panel comprises a front side, two front-lateral sides disposed to sandwich the front side and inclined rearwardly from the front side, two lateral-curved sides extending rearwardly from the two front-lateral sides respectively and curved inwardly with respect to each other, two rear-lateral sides extending toward each other from the two lateral-curved sides, and a rectangular projection extending from inside the rear-lateral sides in a direction opposite to the front side,
    said rear panel comprises a front side, two front-lateral sides and two lateral-curved sides, having shapes similar to those of the front panel, and two rear-lateral sides extending toward each other from the two lateral-curved sides of the rear panel with a rectangular cut therebetween,
    said front portion, when the front and rear panels are sewed at the peripheral portions, forms an upper part for receiving a head of the occupant, said upper part having an upwardly protruding curved edge, and two laterally protruding upper curved edges extending smoothly from the upwardly protruding curved edge; a middle part having two laterally inwardly curved middle side edges extending smoothly from the laterally protruding upper curved edges; and, a lower part for receiving a body of the occupant, said lower part having two laterally inwardly and downwardly curved lower side edges extending smoothly from the middle side edges, and a downwardly protruding curved edge, said lower part having a lateral width greater than that of the upper and middle parts to thereby form laterally projecting portions for receiving occupant's arms, and
    the downwardly extending curved edge at the lower part has a curvature greater than that of the upwardly extending curved edge at the upper part.

2. An airbag according to claim 1, wherein the upper and lower parts have maximum lateral widths, and the middle part has a minimum lateral width, said maximum lateral width at the upper part being greater than the minimum lateral width at the middle part and less than the maximum lateral width at the lower part.

3. An airbag according to claim 2, wherein the lateral width at the upper part is larger than the minimum lateral width at the middle part by 50 to 100 mm, and the maximum lateral width at the lower part is larger than the maximum lateral width at the upper part by 100 to 150 mm.

4. An airbag according to claim 2, wherein the minimum lateral width at the middle part is located at a center between top and bottom of the upper and lower parts.

5. An airbag system comprising the airbag according to claim 1, and an inflator for inflating the airbag.

6. An airbag according to claim 1, wherein said two rear-lateral sides of the rear panel extend inwardly and rearwardly in a direction opposite to the front side thereof.

* * * * *